United States Patent [19]
Chang et al.

[11] Patent Number: 5,142,291
[45] Date of Patent: Aug. 25, 1992

[54] PASSIVE MICROWAVE NEAR-FIELD TOMOGRAPHIC IMAGING SYSTEM AND METHOD

[75] Inventors: Donald C. D. Chang, Thousand Oaks; Joseph G. Gurley, Los Angeles; Frank A. Hagen, Los Angeles; Samuel C. Reynolds, Los Angeles; Kar W. Yung, Torrance, all of Calif.

[73] Assignee: Hughes Aircraft Company, Los Angeles, Calif.

[21] Appl. No.: 563,129

[22] Filed: Aug. 3, 1990

[51] Int. Cl.$^5$ .............................. G01S 5/02; G01S 3/16
[52] U.S. Cl. ................................... 342/424; 342/378; 342/351
[58] Field of Search ............... 342/191, 351, 378, 424, 342/25

[56] References Cited

U.S. PATENT DOCUMENTS

| | | | |
|---|---|---|---|
| 4,794,395 | 12/1988 | Cindrich et al. | 342/424 |
| 4,963,877 | 10/1990 | Wood et al. | 342/25 |
| 4,990,925 | 2/1991 | Edelsohn et al. | 342/424 |

*Primary Examiner*—Gregory C. Issing
*Attorney, Agent, or Firm*—Gordon R. Lindeen, III; Steven M. Mitchell; Wanda K. Denson-Low

[57] ABSTRACT

A technique for near-field tomographic imaging using a multiple-receiver correlating interferometer. A target object or scene to be imaged is located in a near-field or Fresnel region of a receiver system. The target object radiates or reflects a signal that is sensed by a plurality of antennas. The received signals are correlated using conventional correlation algorithms. An image pixel for a focal point is then computed by correcting a differential time delay between a signal emitted at the focal point and received at first and second antennas. The system is focused on the target object by correcting a phase term of the correlation algorithms. The phase term is corrected by multiplying the correlation algorithms by a phase factor. A peak correlated value is developed when the focal point is at the target object location. A series of snapshots is generated from data produced by the focussing process, as the focal point is moved through the scene. The snapshots are successively superimposed, using tomographic techniques, to form a high resolution image map. The system achieves extremely high resolutions, rivalling those of synthetic aperture radar.

11 Claims, 1 Drawing Sheet

PASSIVE MICROWAVE NEAR-FIELD TOMOGRAPHIC IMAGING SYSTEM AND METHOD

BACKGROUND

The present invention relates generally to radiometric imaging technology, and more particularly, to high resolution imaging using passive systems and methods.

Microwave imaging is used to generate high resolution ground and ocean maps. Imaging with sufficiently fine resolution enables topographic features and objects of interest on the ground or sea to be recognized. Current high resolution imaging techniques include synthetic aperture radar (SAR), useful for far-field operation, and triangulation methods using several antennas that locate active emitters. However, passive systems are more advantageous, since they prevent detection when gathering data used for generation of these maps.

Synthetic aperture radar is designed to provide far-field imaging. Since cloud cover does not impair the effectiveness of synthetic aperture radar, this system provides high resolution ground mapping under various meteorological conditions. The resolution possible with SAR systems improves as the integration time and bandwidth are increased. However, synthetic aperture radar is an active system, and its presence may be detected.

One accepted method of passive imaging uses well known triangulation principles. Triangulation is a process of directional location of active emitters from several disperate positions. The resolution possible with this technique improves as the size of its antennas is increased. However, in order to have high resolution, very large antennas must be employed. Since triangulation involves at least three receiving locations, these systems are typically costly.

Therefore, a need exists for passive high resolution imaging systems that may be implemented using small antennas. There also exists a need for a passive system that is not readily detectable. It would also be desirable to have a passive system that provides imaging resolution comparable to that of synthetic aperture radar. Accordingly, it is an objective of the present invention to provide an interferometer imager that combines a large number of measurements to achieve extremely high resolutions rivalling those of synthetic aperture radar. A further objective of the invention is to provide a passive imaging system incorporating relatively small antennas. Still another objective of the present invention is to provide an imaging system that utilizes tomographic techniques. A still further objective of the invention is to provide a passive imaging system having a small number of antennas.

SUMMARY OF THE INVENTION

In accordance with these and other objectives of the present invention, there is provided a near-field tomographic imaging system. The tomographic imaging system is a generalized multiple-receiver correlating interferometer that uses complex tomography to combine a large number of measurements. A feature of the invention is that it provides high-resolution imaging using passive methods.

A target to be imaged is located in a near-field or Fresnel region of a receiver system. Two or more receivers are positioned in a known spatial relationship relative to one another. The receivers have antennas that sense signals radiated from the target, and the sensed signals are time correlated using correlation algorithms. A focal point for the system is computed by defining a focus location in the scene. The focus location is defined by correcting the differential time delay between signals emitted at the focus location and received at the first and second antennas.

The system focuses on the target by correcting a phase term in the correlation algorithms, and a peak correlation value is developed when the focal point is at the target location. A complex map or snapshot is generated from data produced during the focussing process, as the antennas move the focal point through the scene. The data gathering and processing processes are repeated to generate a series of complex maps or snapshots. The snapshots are then successively superimposed using tomographic techniques to form a high resolution image map.

The resolution depends on the distance between the antennas, the amount of relative motion between antennas and the bandwidth of the signal received from the target. Extremely high resolution rivalling that of synthetic aperture radar is achievable, and the invention provides high resolution imaging using antennas much smaller than those used in other passive imaging techniques.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
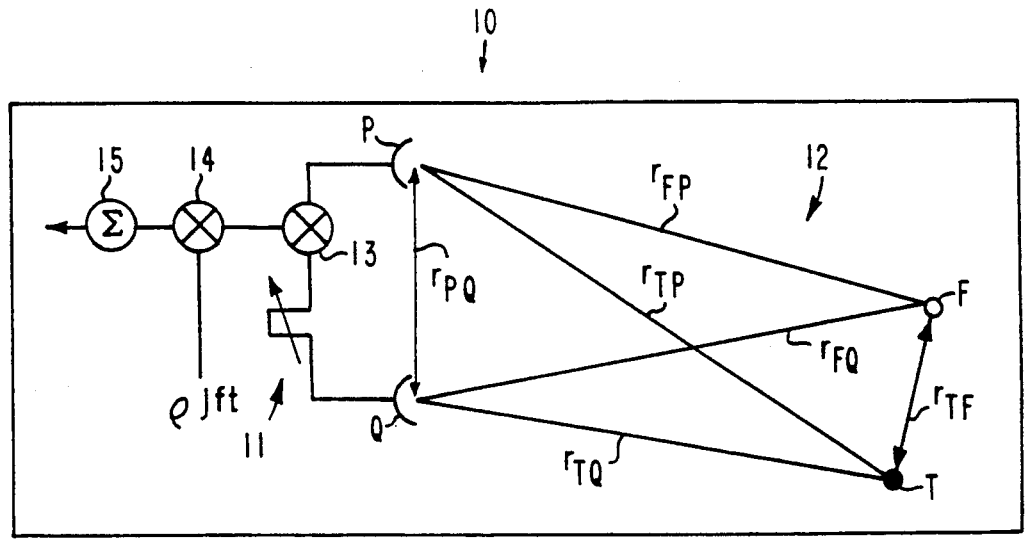
FIG. 1 is a schematic diagram of a passive microwave near-field tomographic imager in accordance with the principles of the present invention.

Referring now to FIG. 1, there is shown an embodiment of a near-field tomographic imaging system 10 in accordance with the principles of the present invention. The tomographic imaging system 10 is shown as a two-element system comprising a generalized multiple-receiver interferometer. The tomographic imaging system 10 is shown having first and second receivers P, Q adapted to receive microwave frequency signals emitted from an image scene 12 and a target T disposed therein. The number of receivers P, Q employed by the tomographic imaging system 10 may vary and is not limited to two. Adjustment means 11 for adjusting the differential delay between signals received at the first and second receivers P, Q is coupled to the second receiver Q, and a first mixer 13 coupled to the first receiver P and the adjustment means 11. The first mixer 13 is adapted to provide corrected differential delay output signals therefrom. An output of the first mixer 13 is coupled to a second mixer 14 that is adapted to receive second order Doppler correction terms ($e^{ift}$) and combine them with the corrected differential delay signals provided by the first mixer 13. Finally, an output of the second mixer 14 is coupled to a summing circuit 15 that is adapted to combine the output signals provided by the second mixer 14 into a high resolution image map as is defined below in the equation (1).

In operation, a target T located in the image scene 12 radiates or scatters microwave energy. F is the focus location for which an image pixel is computed. The lines represent the ranges between the various points in the system. The lines $r_{FP}$, $r_{TP}$, $r_{FQ}$, $r_{TQ}$, $r_{QP}$ and $r_{TF}$ represent distances between the first receiver P and the focal point F, the first receiver P and target object T, the second receiver Q and the focal point F, the second receiver Q and the target object T, the second receiver Q and the first receiver P, and the target object T and the focal point F, respectively.

A target T radiating or scattering a signal generates a peak response when the focal point F of the system 10 is moved to coincide with the target location T. The tomographic imaging system 10 achieves a focus at the focal point F by adjusting the differential delay between two imaging paths to zero. For example, adding a time delay $\Delta = r_{FP} - r_{FQ}$ to a signal received at the second receiver Q from focal point F, that travels a distance $r_{FQ}$, results in a differential delay distance of $\delta = r_{FP} - (r_{FQ} + \Delta) = 0$.

The term $e^{ift}$ incorporates a Doppler correction factor $f$. The Doppler correction term $f$ is an optional second order correction, applied during the time of integration to generate one snapshot, as will be described with reference to FIG. 2. The final mathematical formulation for operation within a single snapshot time is defined by:

$$I_{ijm} = \int_{-\frac{\Delta T}{2}}^{\frac{\Delta T}{2}} e_i(t + \Delta_m) e^*_j(t) e^{if_m t} dt \quad (1)$$

where $\Delta T$ is the snapshot time, $f_m$ is the Doppler correction factor for the $m^{th}$ focus point $F_m$, $\Delta_m$ is the differential time delay for the focal point F. At each sample time, the above focussing correction is applied for each focal point F in the scene 12 to generate a two- or three-dimensional snapshot of the scene 12. Typically, the data values used in the snapshot comprise complex signal values, or in-phase and quadrature values. However, if the sample rate is sufficiently high, and $\Delta_m$ is calculated more frequently, there is no need for the Doppler correction term $f_m$.

Figure 2:
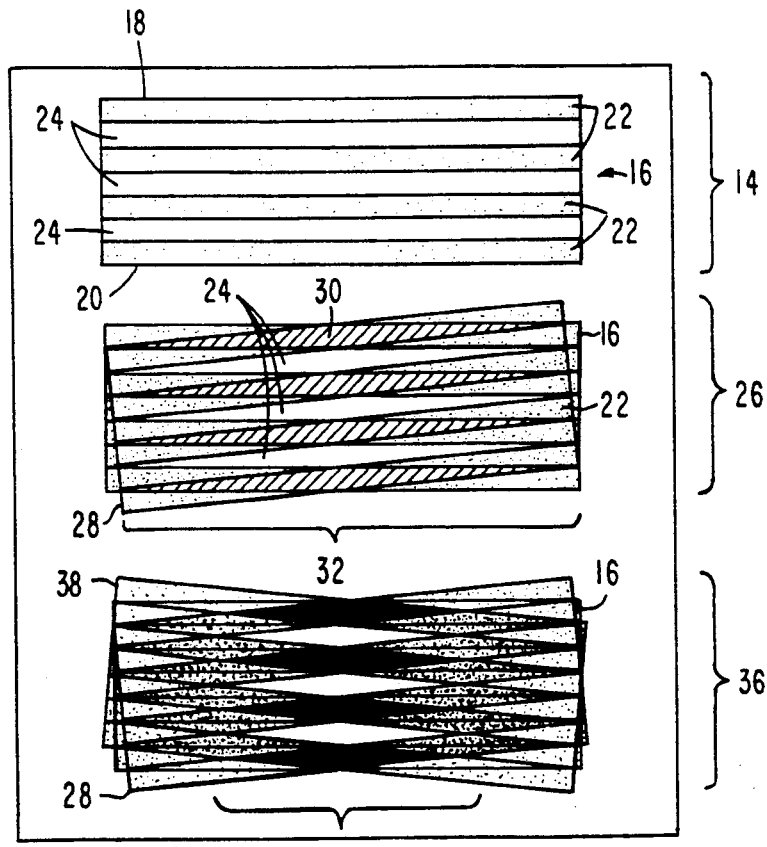
FIG. 2 is a diagram which shows the process of successively superimposing snapshots using complex tomography techniques in accordance with the principles of the present invention.

A snapshot is a two- or three-dimensional complex map of the system response to the scene 12 at a single point in time. As the first and second receivers P, Q in the tomographic imaging system 10 move along trajectories (not shown), a series of snapshots is generated. Successive snapshots are superimposed as illustrated in FIG. 2 to form an image map (not shown). By retaining complex data throughout the mapping process, successive snapshots cause portions of the image map to cancel out while other portions build up to generate image features. This procedure is a relatively simple form of complex tomography, and more complicated methods are possible. This process is somewhat similar to the aperture synthesis technique employed in the RAD-SAR thermal imaging system described in U.S. Pat. No. 4,724,439 issued to Wiley et al., which is incorporated herein by reference.

The preliminary image results (snapshots and/or tomographic maps) are typically accumulated as data until a sufficiently detailed and accurate map is assembled. Once such a map is assembled, it may be output to a CRT display or hardcopy device, or placed into permanent storage. The number of snapshots needed depends on system requirements.

The resolution depends on the distance between the antennas, the amount of relative motion between antennas and the bandwidth of the signal received from the target. If desired, one of a plurality of antennas tracking the target object may be stationary, and the other antennas may move along various trajectories for gathering data to accumulate a series of multi-dimensional complex maps. Alternatively, all of the antennas may move relative to each other. The antennas may be disposed in relatively close proximity or in relatively far proximity.

The tomographic imaging system 10 functions best with wide-bandwidth microwave frequency signals. Consequently, it is well suited for the detection and localization of low-observable or low-probability-of-detection signals, such as spread-spectrum communication links. The tomographic imaging system 10 is unique, since it operates in the near-field region of the interferometer. The tomographic imaging system 10 takes advantages of the curvature of the interference fringes in the near field to achieve extremely high resolution. This operation may be understood with reference to a standard wave equation. Note that to simplify the necessary equations, a single-frequency case is discussed. A signal radiated from the target object T and received at the first receiver P has the mathematical form $$e_{PT} = A_t e^{-jkr_{TP}}.$$

The same signal received at the second receiver Q has the mathematical form $$e_{QT} = A_t e^{-jkr_{TQ}}.$$

Correlation of these two signals results in a phase term, which if left uncorrected, causes the time average of the correlation to go zero as the first and second receivers P, Q move in accordance with the relationship $$e_{PT} e_{QT}^* = (A_t)^2 e^{-jk(r_{TP} - r_{TQ})}.$$

In order to focus at the target point T, the phase term must be removed. Mathematically, the phase term is corrected by multiplying one or both of the received signals e by a phase correction factor. The phase correction factor is given by the equation $$w = e^{jk(r_{FP} - r_{FQ})}.$$

Multiplying the above correlation product by w yields the expression $$e_{PT}(e_{QT}w)^* = (A_t)^2 e^{-jk(r_{TP} - r_{TQ})} e^{jk(r_{FP} - r_{FQ})}$$
$$= e_{PT}(e_{QT}w)^* = (A_t)^2 e^{-jk[(r_{TP} - r_{TQ}) - (r_{FP} - r_{FQ})]}.$$

This is the autocorrelation function of a signal, as a function of the time difference $\Delta$, where $\Delta = [(r_{TP} - r_{TQ}) - (r_{FP} - r_{FQ})]$. As the focal point F is moved through the scene 12, by adjusting w, the level of autocorrelation varies, reaching a peak when the focal point F is at the target location T. The compound width of the autocorrelation peak is inversely proportional to the signal bandwidth. Wider signal bandwidth results in better resolution. The phase correction term w may be computed and applied exactly as described above, as long as the differential delay $(r_{FP}-r_{FQ})/c$ is less than $1/B$, where B is the system bandwidth. This condition requires that either the bandwidth is narrow or that the two paths $r_{FP}$ and $r_{FQ}$ are nearly equal. However, if the difference in arrival time of the two signals $e_{PT}$ and $e_{QT}$ is too large, the signals may become uncorrelated, so that the phase term becomes random and cannot be corrected by this technique. In this case, a more general technique that generates the same autocorrelation is required.

This more general technique is the direct adjustment of the differential time delay $(r_{FP}-r_{FQ})/c$ to a value less than $1/B$, prior to correlation. Once this adjustment is made, any residual delay error results in a smaller phase term, which can then be corrected mathematically, as described above. The autocorrelation only accounts for resolution in one direction, namely the axis parallel to line $r_{PQ}$ between the first and second receivers P, Q as projected into the scene 12.

Referring again to FIG. 2, there is shown the effect of superimposing successive snapshots 16 of the scene 12 to achieve complex tomography. The well-known peaking effect of the autocorrelation function, as illustrated in relation to FIG. 1, describes the amplitude of the response within the scene 12. Because the tomographic imaging system 10 uses complex data such as in-phase and quadrature signal data throughout the imaging process, another effect occurs, as will be described below.

The preceding calculations were performed to compute the response at each point in the scene 12, to generate a snapshot 16 of the scene 12. As the first and second receiver P, Q move with respect to the scene 12, the same focus point F is maintained by changing the phase correction factor w. By adding successive computed responses with optional weighting factors at the same focus point F, the accumulated response may be suppressed or enhanced at each focus point F. This complex tomographic effect is possible since complex data is maintained. Within the autocorrelation envelope the in-phase and quadrature terms each exhibit an interference pattern that repeats at intervals of about one half wavelength. The exact spacing depends on differential path lengths and on geometry.

A topmost portion 19 of FIG. 2 shows the in-phase term of the interference pattern for a single snapshot 16. A narrow-bandwidth case is shown for clarity, resulting in a flat amplitude from top 18 to bottom 20 of the snapshot 16. Dotted bands 22 represent negative lobes of the pattern and white bands 24 represent positive lobes. The quadrature portion is identical to this, but phase shifted ninety degrees. This configuration results in a smooth amplitude envelope. A center portion 26 of FIG. 2 shows the effect of superimposing two successive snapshots 16, 28 of the scene 12. Crosshatched areas 30 indicate larger negative values, while dotted bands 22 are closer to zero, and the white areas 24 are positive lobes. A region 32 where the bands 22, 24, 30 narrow, compared to the topmost portion 19 illustrates a complex tomographic focussing effect. A bottommost portion 36 of FIG. 2 illustrates the addition of a third snapshot 38. A narrowing region 40 shows how the complex tomographic focussing effect is strongly apparent with only a small number of snapshots 16,28,38.

The tomographic imaging system 10 accumulates a large number of snapshots 16 over an extended period of time. Increasing the distance traveled by the receivers relative to the scene 12 improves the resolution of the image map. The theoretical resolution of the tomographic imaging system 10 is limited by the field of view of the individual receivers P, Q. Better resolution may be achieved with smaller antennas employed in the receivers P, Q which exhibit a larger field of view or by tracking a target area in a spotlight mode. However, practical limits do exist since smaller apertures degrade the signal-to-noise ratio and degrade the sensitivity of the system 10.

Thus, there has been described a new near-field tomographic imager system that provides improved performance compared to prior passive imaging techniques. The system uses complex tomography to combine a large number of measurements to achieve extremely high resolution. The system generates an image map of a scene from signals radiated or scattered by the scene. Since the invention functions best with wide-bandwidth signals, it is well suited for the detection and localization of low-observable or low-probability-of-detection signals, such as spread-spectrum communication links. The invention is capable of achieving resolution comparable to syntheticaperture radar. The invention provides high resolution using antennas much smaller than used in triangulation techniques.

It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A method of passive imaging using a multiple-receiver interferometer, said method comprising the steps of:
   positioning a plurality of antennas in a predetermined known relationship that are adapted to receive signals;
   sensing signals radiated and/or reflected from a target object in an image scene;
   correlating the signals sensed by the antennas using correlation algorithms to produce correlated signals;
   computing an image pixel for a focal point by defining a focus location on the scene by correcting a differential time delay between a signal emitted at the focus location and received at a first receiver and the signal emitted at the focus location and received at a second receiver, the first and second antennas having a predetermined distance therebetween;
   generating a complex map from data produced by the focussing process as the focal point is moved through the scene;
   moving the antennas along at least one trajectory and repeating the data gathering and data processing processes for generating a series of complex maps;
   successively superimposing complex maps using tomographic techniques to form an image map; and
   focussing on the target object by correcting a phase term of the correlation algorithms, wherein a peak correlated value is developed when the focal point is at the target object location.

2. The method of claim 1 wherein one of a plurality of antennas tracking the target object is stationary and subsequent antennas tracking the target object move along known trajectories for gathering data to accumulate a series multi-dimensional complex maps.

3. The method of claim 1 wherein the step of focussing on the target object by correcting a phase term of the correlation algorithms comprises the step of adjustment of the differential time delay $(r_{FP}-r_{FQ})/c$ to a value less than $1/B$, prior to correlation, where B is the bandwidth of the interferometer, and wherein the term $r_{FP}$ is the range from one of the antennas to the focal point, the term $r_{FQ}$ is the range from a second antenna to the focal point, and the term "C" is the velocity of light.

4. The method of claim 1 further comprising the step of removing residual phase error by multiplying the correlated signals by a phase correction term.

5. The method of claim 3 further comprising the step of removing residual phase error by multiplying the correlated signals by a phase correction term.

6. The method of claim 1 wherein the received microwave signals are complex in-phase and quadrature signals.

7. A method of imaging using a multiple-receiver interferometer in a near-field region for advantageous usage of curvature of interference fringes, said method comprising the steps of:
- positioning in desired locations a plurality of antennas that are adapted to receive signals;
- sensing signals radiated from a scene;
- time correlating the signals sensed by the antennas using correlation algorithms;
- computing an image pixel for a focal point by correcting a differential time delay between a signal emitted at the focal point and received at a first receiver and the signal emitted at the focal point and received at a second receiver;
- generating a snapshot from data produced by executing a focussing correction algorithm from input of autocorrelated signals received by the antennas as the focal point is moved through the scene, and wherein a peak correlated value is developed when the focal point is at a target object location in the scene;
- moving the antennas along predetermined trajectories for generating a series of snapshots; and
- successively superimposing snapshots to form an image map.

8. The method of claim 7 wherein one of the plurality of antennas is stationary and the remainder of the antennas are moving along known trajectories.

9. The method of claim 7 wherein all antennas move relative to each other.

10. A method of passive microwave near-field tomographic imaging using a multiple-receiver correlating interferometer, said method comprising the steps of:
- sensing signals derived from a target object in the image scene by first and second antennas have a predetermined distance therebetween;
- correlating the signals sensed by the antennas using predetermined correlation algorithms;
- computing an image pixel for a focal point by defining a focus location on the scene by correcting a differential time delay between a signal emitted at the focus location and received at a first receiver and the signal emitted at the focus location and received at a second receiver, the first and second antennas having a predetermined distance therebetween, and wherein the focal point is used in deriving a phase factor;
- focussing on the target object by correcting a phase term of the correlation algorithms by multiplying the correlation algorithms by the phase factor, a peak correlated value being developed when the focal point is at the target object location;
- generating a complex map from data produced by the focussing process as the focal point is moved through the scene;
- moving the antennas along at least one trajectory and repeating the data gathering and data processing processes for generating a series of complex maps; and
- successively superimposing complex maps using tomographic techniques to form an image map.

11. A passive microwave near-field imaging system comprising:
- first and second microwave radiation receivers adapted to receive microwave energy signals derived from an image scene and objects contained therein;
- differential correction means coupled to the first receiver for adjusting the differential delay of the microwave energy signals received thereby such that the focal distance from each receiver to each focal point in the scene is substantially the same;
- first mixing means coupled to the differential correction means and second receiver for cross-correlating the signals processed thereby;
- summing means coupled to the first mixing means for combining the output signals provided thereby to produce an image of the scene, and
- a second mixing means coupled between the first mixing means and the summing means for multiplying the signals provided by the first mixing means by a second order Doppler correction factor.

* * * * *